United States Patent
Abdallah et al.

(10) Patent No.: US 12,011,001 B1
(45) Date of Patent: Jun. 18, 2024

(54) SUSTAINABLE NANOPARTICLE FORMULATION FOR MANAGEMENT OF RED PALM WEEVIL

(71) Applicant: KING FAISAL UNIVERSITY, Al-Ahsa (SA)

(72) Inventors: Basem Mohamed Abdallah, Hofouf (SA); Enas Mohamed Ali, Hofouf (SA); Salaheldin Abdelraouf Abdelsalam, Hofouf (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/417,535

(22) Filed: Jan. 19, 2024

(51) Int. Cl.
| | |
|---|---|
| *A01N 65/08* | (2009.01) |
| *A01N 25/22* | (2006.01) |
| *A01N 25/26* | (2006.01) |
| *A01N 25/28* | (2006.01) |
| *A01P 7/04* | (2006.01) |

(52) U.S. Cl.
CPC ............ *A01N 65/08* (2013.01); *A01N 25/22* (2013.01); *A01N 25/26* (2013.01); *A01N 25/28* (2013.01); *A01P 7/04* (2021.08)

(58) Field of Classification Search
CPC ................................ A01N 65/08; A01N 55/00
See application file for complete search history.

(56) References Cited

U.S. PATENT DOCUMENTS 11,938,151 B1 * 3/2024 Ali ..................... A61K 36/31

OTHER PUBLICATIONS

Department, Agricultural and Biological Research Division, National Research Centre, 33rd ElBohouth St.—Dokki, Giza, Egypt; King Khalid University, Abha, Saudi Arabia; Plant Protection Research Institute A. R. C. Dokk; "Virulence of Nano-Particle Preparation of Entomopathogenic Fungi and Entomopathogenic Bacteria Against Red Palm Weevil *Rhynchophorus ferrugineus* (Olivier) (Coleoptera: Curculionidae)"; 2020.

Suez Canal University; Zagazig University; "Climate Change Impacts on Agriculture and Food Security in Egypt"; 2020.

Jiangsu University of Science and Technology; University for Development studies, Tamale, Ghana; "Biocontrol of Bacteria Associated With Pine Wilt Nematode, *Bursaphelenchus xylophilus* by Using Plant Mediated Gold Nanoparticles"; Oct. 2021.

Guerrero-Analco et al.; "Antifungal and Insecticidal Activities of Selected Plant Species From Cloud Forest Veracruz, Mexico: A Contribution To the Search of Novel Control Agents Against Ambrosia Pest Complexes"; May 2023.

* cited by examiner

*Primary Examiner* — John Pak
(74) *Attorney, Agent, or Firm* — Nath, Goldberg & Meyer; Richard C. Litman

(57) ABSTRACT

A gold nanoparticle composition for controlling or inhibiting the growth of red palm weevil. The gold nanoparticle composition can include *Peperomia blanda* gold nanoparticles (PB-AuNPs) either alone or in combination with a separate extract of *Peperomia blanda* (PB), thereby forming PB-AuNPs/PB. In an embodiment, the PB-AuNPs/PB can be applied to soil to protect a date palm plant growing therein from red palm weevil.

20 Claims, 2 Drawing Sheets

SUSTAINABLE NANOPARTICLE FORMULATION FOR MANAGEMENT OF RED PALM WEEVIL

BACKGROUND

1. Field

The disclosure of the present patent application relates to gold nanoparticles, and particularly, to a gold nanoparticle composition for controlling growth of red palm weevil.

2. Description of the Related Art

Recently, nanoparticles have demonstrated important uses in a variety of fields. Nanoparticles have been used in electronics, sensing, optics, and medicine, for example.

Synthesis of nanoparticles has been achieved by a variety of methods, including physicochemical, thermal decomposition, electrochemical, microwave assisted, sonochemical, solvothermal, photosynthesis, photochemical reduction, chemical reduction and continuous-flow methods. These methods are often costly or produce by-products that pose increased risks to human health and the environment.

In recent years, green or environmentally friendly chemical methods have been developed to prepare nanoparticles using plant extracts. Green chemistry has the advantage of being safer, faster, environmentally friendly, and economical. However, the rise of green methods of preparing nanoparticles has also demonstrated that the activities and characteristics of the nanoparticles vary significantly, depending upon the detailed method of synthesis and specific plant extract used.

The red palm weevil, which has a scientific name of *Rhynchophorus ferrugineus*, is the most dangerous pest that attacks palm trees, especially date palm trees, which represent a strategic crop in arid lands, and have thus been causing serious economic consequences in commercial date palm tree farms. Red palm weevils survive with a symbiotic association of a variety of microflora including protozoa in the hind gut and ligo-cellulose digestive tracts. The mutualistic associations of these microbes help the red palm weevils to be able to degrade wood and wood constituents, such as cellulose and hemi-cellulose, which is plant-derived biomass.

Palm weevil control depends on the use of pesticides, which results in environmental pollution that may affect human health. Therefore, there is an urgent need for alternative methods that are environmentally safe and highly effective to combat the weevil, especially to eliminate the possibility of early infection of palm trees, which provides reassurance to owners of palm farms.

Thus, nanoparticles synthesized using an environmentally friendly method solving the aforementioned problems are desired.

SUMMARY

The present subject matter relates to a gold nanoparticle composition for controlling or inhibiting the growth of red palm weevil. The gold nanoparticle composition can include green biosynthesized *Peperomia blanda* gold nanoparticles (PB-AuNPs) or gold nanoparticles prepared using an extract of *Peperomia blanda* (PB). In an embodiment, the *Peperomia blanda* gold nanoparticles (PB-AuNPs) can be applied to the soil of a plant, either alone or in combination with a leaf extract of *P. Blanda* (PB), i.e., PB-AuNPs/PB, to protect the plant from red palm weevil. In an embodiment, the plant is a date palm tree.

According to an embodiment, the gold nanoparticle composition or *Peperomia blanda* extract gold nanoparticle composition (PB-AuNPs) can be prepared by providing a *Peperomia blanda* extract, such as an aqueous leaf extract of *Peperomia blanda*, mixing the *Peperomia blanda* extract with gold chloride ($HAuCl_4$), and incubating the mixture followed by purification to obtain the *Peperomia blanda* gold nanoparticles.

According to an embodiment, the present subject matter relates to *Peperomia blanda* gold nanoparticles prepared by the methods as described herein. In an embodiment, the PB-AuNPs can be capped by photobioactives of the PB extract to provide long-term stabilization for insecticidal activities.

In an embodiment, a method of inhibiting or stopping the growth of red palm weevil can include applying *Peperomia blanda* gold nanoparticles, either alone or in combination with a separate PB extract, directly to the soil of a date palm plant.

These and other features of the present subject matter will become readily apparent upon further review of the following specification.

DETAILED DESCRIPTION OF THE PREFERRED EMBODIMENTS

Figure 1:
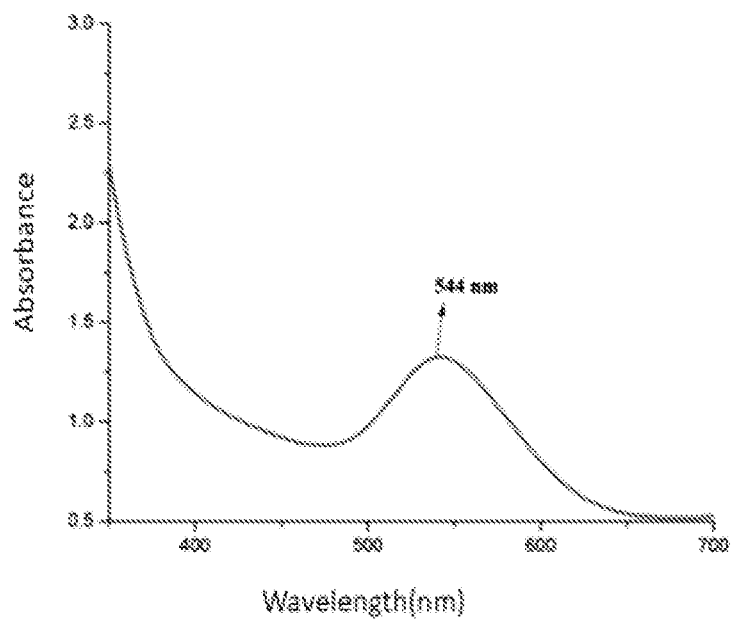
FIG. 1 shows UV-Visible absorption spectra of gold nanoparticles.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a +10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

The present subject matter relates to a gold nanoparticle composition for controlling or inhibiting the growth of red palm weevil. The gold nanoparticle composition of *Peperomia blanda* gold nanoparticles (PB-AuNPs) can be gold nanoparticles prepared using an extract of *Peperomia blanda* (PB). In an embodiment, the *Peperomia blanda* gold nanoparticles can be used to protect a date palm tree from red palm weevil, either alone or in combination with a PB extract.

According to an embodiment, the gold nanoparticle composition or *Peperomia blanda* extract gold nanoparticle composition (PB-AuNPs) can be prepared by providing a *Peperomia blanda* extract, such as an aqueous leaf extract of *Peperomia blanda*, mixing the *Peperomia blanda* extract with gold chloride (HAuCl$_4$), and incubating the mixture followed by purification to obtain the *Peperomia blanda* gold nanoparticles.

In an embodiment, a method of inhibiting or stopping the growth of red palm weevil can include applying the *Peperomia blanda* gold nanoparticles (PB-AuNPs) directly to the soil of a date palm plant, either alone or in combination with a separate PB extract, such as an aqueous leaf extract of PB. When used in combination, the green biosynthesized gold nanoparticles (PB-AgNPs) biofabricated using aqueous leaf extract of *Peperomia blanda* (PB) described herein are mixed with leaf extract of *P. blanda* to obtain PB-AuNPs/PB. Further, as used herein, the soil of a date palm plant can refer to the soil from which the date palm plant grows. In this regard, the phrases "date palm tree" and "date palm plant" can be used interchangeably herein.

In an embodiment, the present subject matter relates to a method of synthesizing *Peperomia blanda* gold nanoparticles, comprising: mixing a *Peperomia blanda* extract with an aqueous solution of gold chloride at room temperature to provide a mixture, leaving the mixture at room temperature for about 30 minutes, at least 30 minutes, or at least about 30 minutes to reduce Au$^{3+}$ to Au$^0$ nanoparticles; incubating the mixture containing the Au$^0$ nanoparticles to obtain *Peperomia blanda* gold nanoparticles in the mixture, purifying the *Peperomia blanda* gold nanoparticles in the mixture to obtain pellets; washing and drying the pellets; and obtaining the *Peperomia blanda* gold nanoparticles.

In an embodiment of the present synthetic methods, the aqueous solution of gold chloride can be a 1 mM aqueous solution of gold chloride. In another embodiment, the mixture can be incubated for about 24 hours, at least 24 hours, or at least about 24 hours at room temperature. In an embodiment, the purifying of the *Peperomia blanda* gold nanoparticles in the mixture can be by centrifugation, for example, by centrifugation at about 10,000 rpm for about 20 minutes, at least 20 minutes, or at least about 20 minutes.

In an embodiment, the *Peperomia blanda* extract can be an extract of leaves of *Peperomia blanda*. In one embodiment, the\ extract of *Peperomia blanda* (PB) can be an aqueous extract.

According to an embodiment, the *Peperomia blanda* extract can be prepared by soaking air dried and milled *Peperomia blanda* plant material in water at room temperature for about 24 hours, at least 24 hours, or at least about 24 hours with occasional shaking to provide a mixture, filtering the mixture to provide a filtered plant material, and centrifuging the filtered plant material to remove particulate materials and provide a purified extract. A pH of the purified extract can be adjusted to about pH 6.9 with about 1.0 M HCl. In an embodiment, the plant parts can be dried leaves of the *Peperomia blanda* plant. In another embodiment, the air dried and milled *Peperomia blanda* plant material can be soaked in the water in an amount of 10% w/v. In a further embodiment, the filtering can be conducted using two or more layers of cheesecloth. In an additional embodiment, the centrifuging can be conducted for about 30 minutes, at least 30 minutes, or at least about 30 minutes at about 10,000 rpm.

Once obtained, the PB extracts can be stored in a refrigerator at about 4° C. for future use.

According to an embodiment, the present subject matter relates to *Peperomia blanda* extract gold nanoparticles (PB-AuNPs) prepared by the methods as described herein.

According to an embodiment, the present subject matter relates to a pesticidal composition including the *Peperomia blanda* extract gold nanoparticles (PB-AuNPs) and an agriculturally acceptable carrier. In a further embodiment, the present subject matter relates to a pesticidal composition including the *Peperomia blanda* extract gold nanoparticles in combination with a separate *Peperomia blanda* extract (PB-AuNPs/PB) and an agriculturally acceptable carrier. Non-limiting examples of suitable carriers include mineral earths such as, for example, silica gels, silicates, talc, kaolin, attaclay, limestone, lime, chalk, bole, loess, clay, dolomite, diatomaceous earth, calcium sulfate, mAunesium sulfate, mAunesium oxide, and ground synthetic materials; fertilizers, such as, for example, ammonium sulfate, ammonium phosphate, ammonium chloride, and ureas; products of vegetable origin, such as, for example, cereal meal, tree bark meal, wood meal and nutshell meal; cellulose powders; polyvinylpyrrolidone; and other solid carriers.

An embodiment of the present subject matter is directed to a method of making a pesticidal composition including mixing the *Peperomia blanda* extract gold nanoparticles (PB-AuNPs) with an aqueous leaf extract of *P. blanda* (PB). For example, the method of making a pesticidal composition can include mixing the components under sterile conditions, either alone or with an agriculturally acceptable carrier with preservatives, buffers, and/or propellants to create the pesticidal composition. In certain embodiments, the *Peperomia blanda* extract gold nanoparticles (PB-AuNPs) with an aqueous leaf extract of *P. blanda* (PB) can be mixed in a 1:1 v/v ratio.

A method of inhibiting or stopping the growth of red palm weevil can include applying any of the pesticidal compositions as described herein directly to the soil of a date palm plant.

The present teachings are illustrated by the following examples.

EXAMPLES

Example 1

Preparation of Aqueous Extract of *P. blanda* Leaves (PB)

Stock aqueous extract of *Peperomia blanda* was prepared by soaking 20 g of air-dried and milled material of the *Peperomia blanda* plant in 200 ml of distilled water (10% w/v) at room temperature for 24 hours with occasional shaking to provide a mixture. The mixture was filtered through two layers of cheesecloth and centrifuged for 30 minutes at 10000 rpm to remove particulate materials and provide a purified extract. A pH of the purified extract was adjusted to pH 6.9 with 1.0 M HCl. The resulting *Peperomia blanda* extract was stored in the refrigerator at 4° ° C. for future use.

Example 2

Gold Nanoparticle Composition Synthesis Using Aqueous Extract of *Peperomia blanda* Leaves (PB-AuNPs)

The filtrate, 20 ml of *P. blanda* leaf extract, was first mixed with 180 ml of 1 mM aqueous solution of gold chloride (HAuCl$_4$) and left at room temperature to react. After 30 min, a change in solution color from yellow to purple/red signified the reduction of Au$^{3+}$ to Au$_0$ nanoparticles. The resulting AuNPs were incubated at room temperature for 24 h, then purified by centrifugation at 10,000 rpm for 20 min to obtain pellets. The pellets were purified by several washes in ethanol and distilled water, then transferred to a Petri dish for overnight drying at 35° C.

Example 3

Preparation of Composition (PB-AuNP/PB)

Aqueous leaf extract of *P. blanda* (100 μg/ml) was mixed with green biosynthesized silver nanoparticles (50 μg/ml). The ratio of the two components was (1:1) (volume/volume).

Example 4

Characterization of Biosynthesized (PB-AuNPs)

Figure 2:
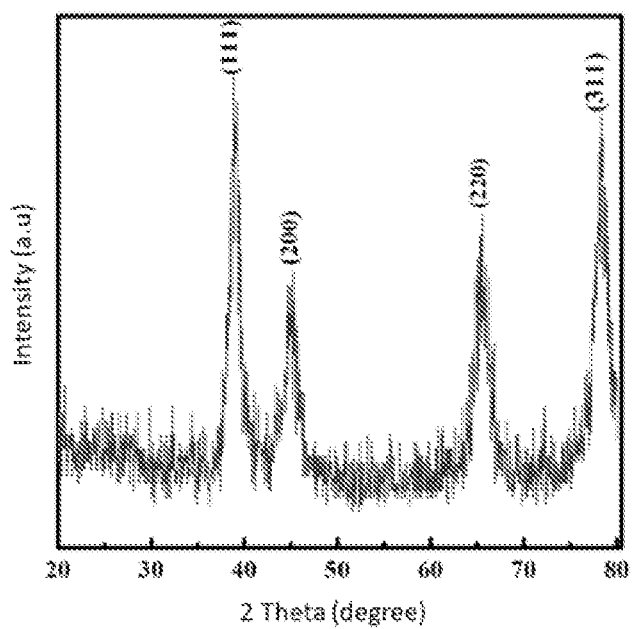
FIG. 2 shows a XRD pattern analyses of the present synthesized gold nanoparticles.
Figure 3:
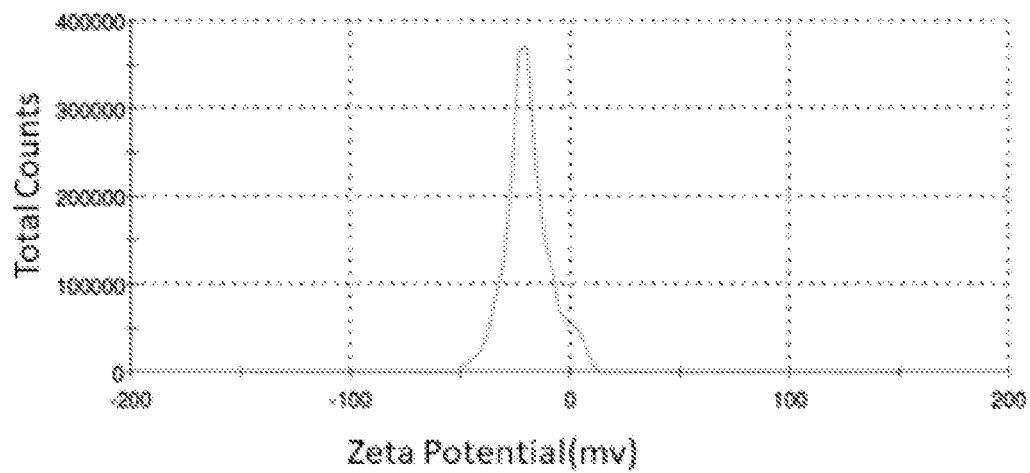
FIG. 3 shows a Zeta potential stabilization pattern analysis of the present synthesized gold nanoparticles.

FIG. 1 displays the change in absorption as Au$^{3+}$ is reduced during 24 h of exposure. The maximum absorbance at 544 nm is attributed to SPR originating from the generation of AuNPs. In other words, the optical absorption spectrum shows a surface Plasmon resonance (SPR) band at 544 nm indicating that it is in a metallic state. X-Ray Diffraction (XRD) performed on the synthesized PA-AuNPs suggests that the material is crystalline in nature (FIG. 2). The XRD peaks are located at 2 Theta=38.18°, 44.38°, 64.57° and 77.56° corresponding to the (1 1 1), (2 0 0), (2 2 0), and (3 1 1) planes of the AuNPs. Zeta Potential (ZP) analysis provided clear information on the surface charge as well as the stability of the synthesized AuNPs. The electric charge on the surface of dispersed PB-AuNPs was measured by a zeta potential analyzer and was found to have a stability value of −19.3 mV, which is considered stable (FIG. 3).

Example 4

Bioefficacy of PB-AuNPs/PB Composition Against Adult Red Palm Weevil, (*Rhynchophorus ferrugineus*)

The efficacy of the plant extract (PB), gold nanoparticles (PB-AuNPs), and their combination (PB-AuNPs/PB) was tested on adult Red Palm Weevil (Table 1). Zero mortality was observed for the negative control treatments. Interestingly, PB-AuNPs/PA showed a higher mortality rate (LT50=8.18 days) compared to the other treatments.

TABLE 1

Direct Contact Bioassay using Gold Nanoparticles, Plant Extract, and their combination.

| | Direct contact bioassay | | | |
| | | 95% confidence level | | |
| Treatment | LT$_{50}$ (Days) | Lower band | Upper band | R$^2$ |
|---|---|---|---|---|
| Plant extract | 50.33 | 5.16 | 20.01 | 0.831 |
| PB-AuNPs | 19.22 | 13.48 | 29.31 | 0.958 |
| PB-AuNPs/PB | 8.18 | 39.65 | 55.52 | 0.987 |
| Cypermethrin (pesticides) 0.05% | 4.981 | 63.19 | 74.16 | 0.896 |
| Tween 80 | 0.0 | 0.0 | 0.0 | 0.0 |

It is to be understood that the gold nanoparticle composition is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A gold nanoparticle composition, comprising *Peperomia blanda* gold nanoparticles (PB-AuNPs), wherein the *Peperomia blanda* gold nanoparticles are capped by components of *Peperomia blanda* extract to provide long-term stabilization for insecticidal activities.

2. The gold nanoparticle composition of claim 1, wherein the *Peperomia blanda* gold nanoparticles are obtained by providing an extract of *Peperomia blanda*; mixing the extract with gold chloride to provide a mixture including the

*Peperomia blanda* gold nanoparticles; incubating the mixture followed by purification; and obtaining the *Peperomia blanda* gold nanoparticles.

3. The gold nanoparticle composition of claim 2, wherein the extract is an extract of leaves of *Peperomia blanda*.

4. A pesticidal composition, comprising the gold nanoparticle composition of claim 1 and an extract of *Peperomia blanda* (PB-AuNPs/PB).

5. A method of inhibiting or stopping growth of red palm weevil, comprising applying the pesticidal composition of claim 4 to soil of a date palm plant.

6. A method of synthesizing *Peperomia blanda* gold nanoparticles, comprising:
   mixing a *Peperomia blanda* extract with a gold chloride solution to provide a mixture;
   incubating the mixture followed by purification; and
   obtaining the *Peperomia blanda* gold nanoparticles.

7. The method of claim 6, wherein the purification is conducted by centrifugation.

8. The method of claim 7, wherein the mixture is incubated for about 24 hours.

9. The method of claim 8, wherein the mixture is incubated at room temperature and the centrifugation is conducted at about 10,000 rpm for about 20 minutes.

10. The method of claim 6, further comprising, following the purification, obtaining pellets, which are washed in ethanol and distilled water, followed by drying at about 35° C.

11. The method of claim 6, wherein the *Peperomia blanda* extract is prepared by a method comprising:
    soaking air dried and milled *Peperomia blanda* plant material in water to provide a mixture;
    filtering the mixture to provide a filtered plant material;
    centrifuging the filtered plant material to remove particulate materials; and
    obtaining the *Peperomia blanda* extract.

12. The method of claim 11, further comprising:
    adjusting a pH of the *Peperomia blanda* extract to a pH of about 6.9.

13. A method of synthesizing a gold nanoparticle composition, comprising:
    mixing a *Peperomia blanda* extract with a gold chloride solution to provide a mixture; and
    incubating the mixture followed by purification to obtain pellets comprising *Peperomia blanda* gold nanoparticles.

14. The method of claim 13, wherein the purification is conducted by centrifugation.

15. The method of claim 14, wherein the mixture is incubated for about 24 hours.

16. The method of claim 15, wherein the mixture is incubated at room temperature and the centrifugation is conducted at about 10,000 rpm for about 20 minutes.

17. The method of claim 13, further comprising, following the purification, washing the pellets in ethanol and distilled water followed by drying at about 35° C.

18. The method of claim 13, wherein the *Peperomia blanda* extract is prepared by a method comprising:
    soaking air dried and milled *Peperomia blanda* plant material in water to provide a mixture;
    filtering the mixture to provide a filtered plant material;
    centrifuging the filtered plant material to remove particulate materials; and
    obtaining the *Peperomia blanda* extract.

19. A gold nanoparticle composition prepared according to the method of claim 13.

20. A method of inhibiting or stopping growth of red palm weevil, comprising applying the gold nanoparticle composition of claim 19 in combination with an extract of *Peperomia blanda* (PB-AuNPs/PB) to soil of a date palm plant.

* * * * *